United States Patent [19]

Godbey et al.

[11] 4,389,164
[45] * Jun. 21, 1983

[54] AUTOMATIC LIQUID LEVEL CONTROLLER

[75] Inventors: John K. Godbey, Dallas; Billy G. Ballard, Garland, both of Tex.

[73] Assignee: Mobil Oil Corporation, New York, N.Y.

[ * ] Notice: The portion of the term of this patent subsequent to Mar. 9, 1999, has been disclaimed.

[21] Appl. No.: 278,437

[22] Filed: Jun. 24, 1981

Related U.S. Application Data

[63] Continuation of Ser. No. 822,506, Aug. 8, 1977, Pat. No. 4,318,674, which is a continuation-in-part of Ser. No. 749,940, Dec. 13, 1976, abandoned, which is a continuation of Ser. No. 563,249, Mar. 28, 1975, abandoned.

[51] Int. Cl.³ .......................................... F04B 49/06
[52] U.S. Cl. ........................................ 417/36; 73/151
[58] Field of Search .................... 417/36, 53; 73/151, 73/290 V

[56] References Cited

U.S. PATENT DOCUMENTS

| 3,817,094 | 6/1974 | Montgomery et al. | 73/151 |
| 3,938,910 | 2/1976 | Douglas | 417/12 |
| 3,965,983 | 6/1976 | Watson | 417/36 |
| 3,985,030 | 10/1976 | Charlton | 73/290 V |
| 3,991,611 | 11/1976 | Marshall et al. | 73/151 |
| 4,121,094 | 10/1978 | Di Vito | 417/36 |

Primary Examiner—William L. Freeh
Attorney, Agent, or Firm—C. A. Huggett; M. G. Gilman; J. F. Powers, Jr.

[57] ABSTRACT

A source of acoustic pressure pulses is coupled to the surface casing of a well so that they are transmitted down the well and reflected by the gas-liquid interface. A transducer is also coupled to the well to produce an electrical signal in response to direct and reflected acoustic pulses occurring in the well. Gating circuitry responds to the transducer for starting and stopping the counting of clock pulses by a digital counter. The digital count controls a pump so that the liquid level in the well is precisely controlled between desired levels.

3 Claims, 7 Drawing Figures

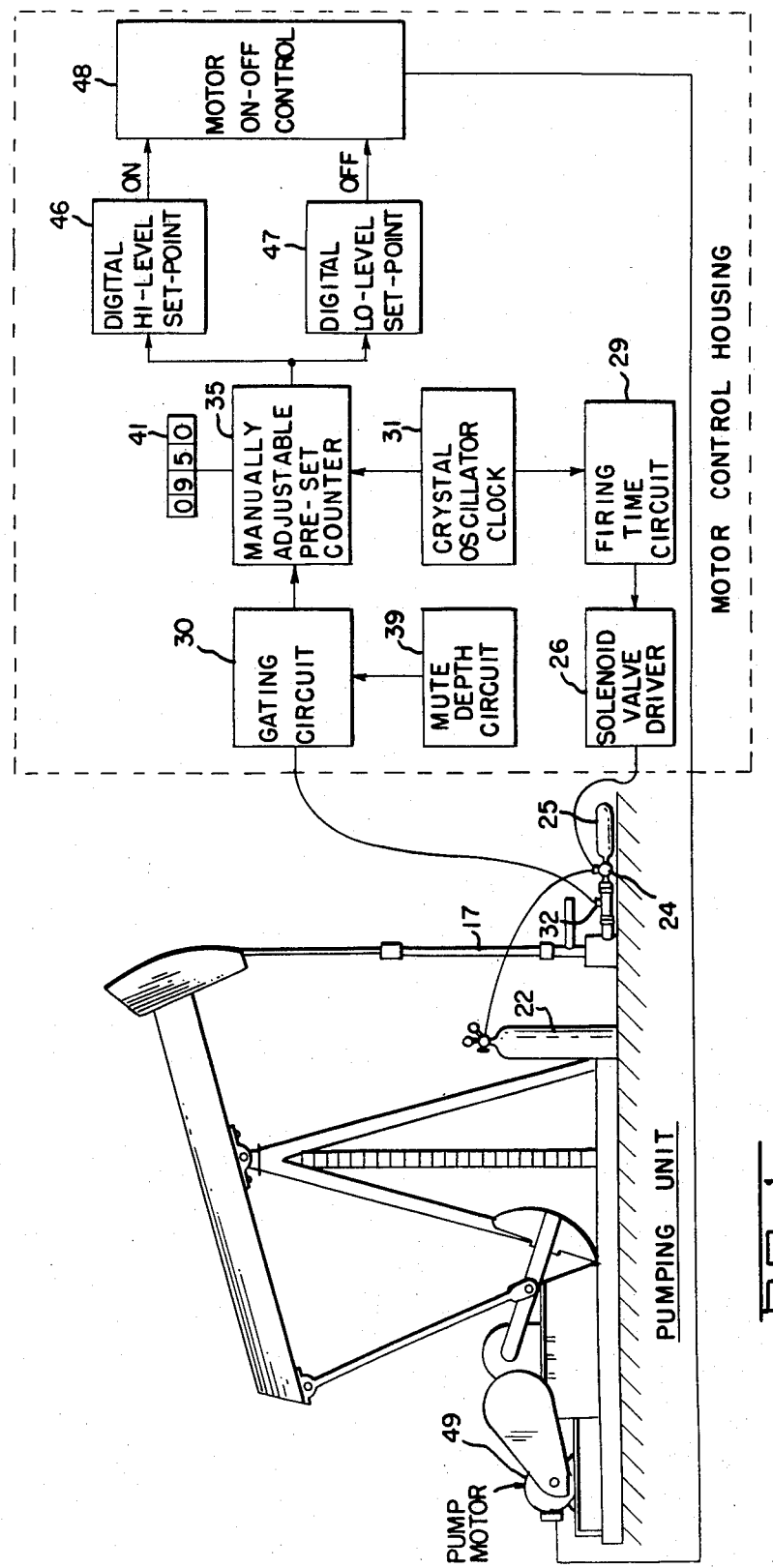

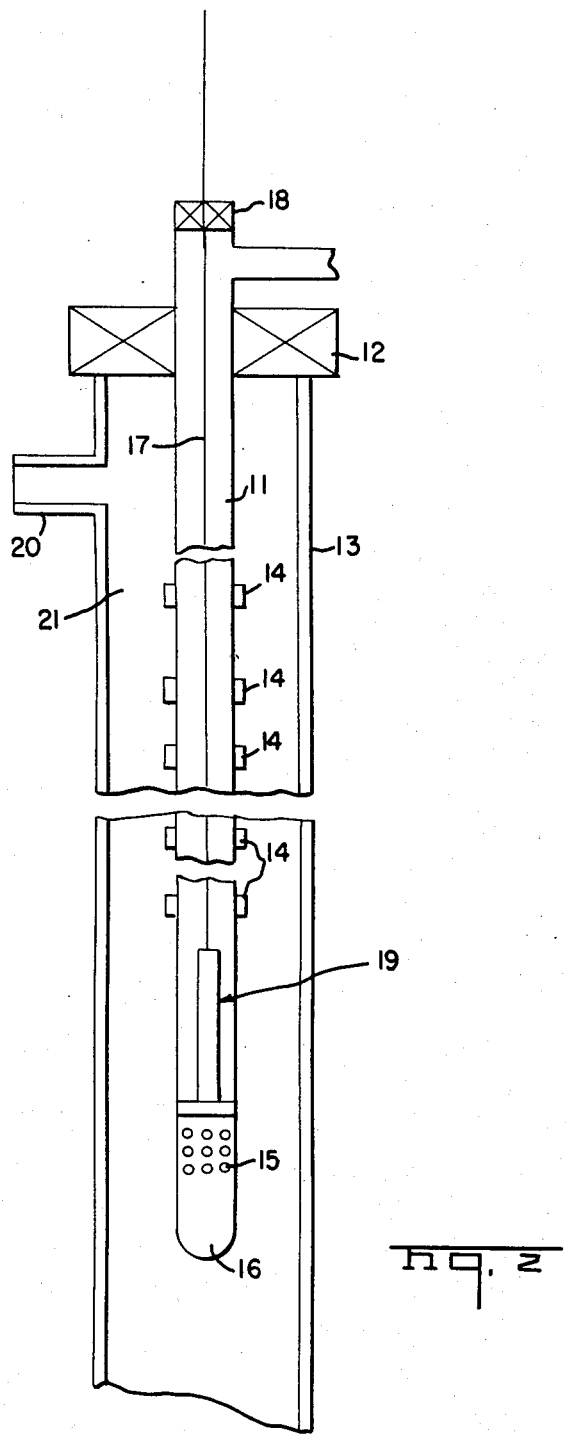

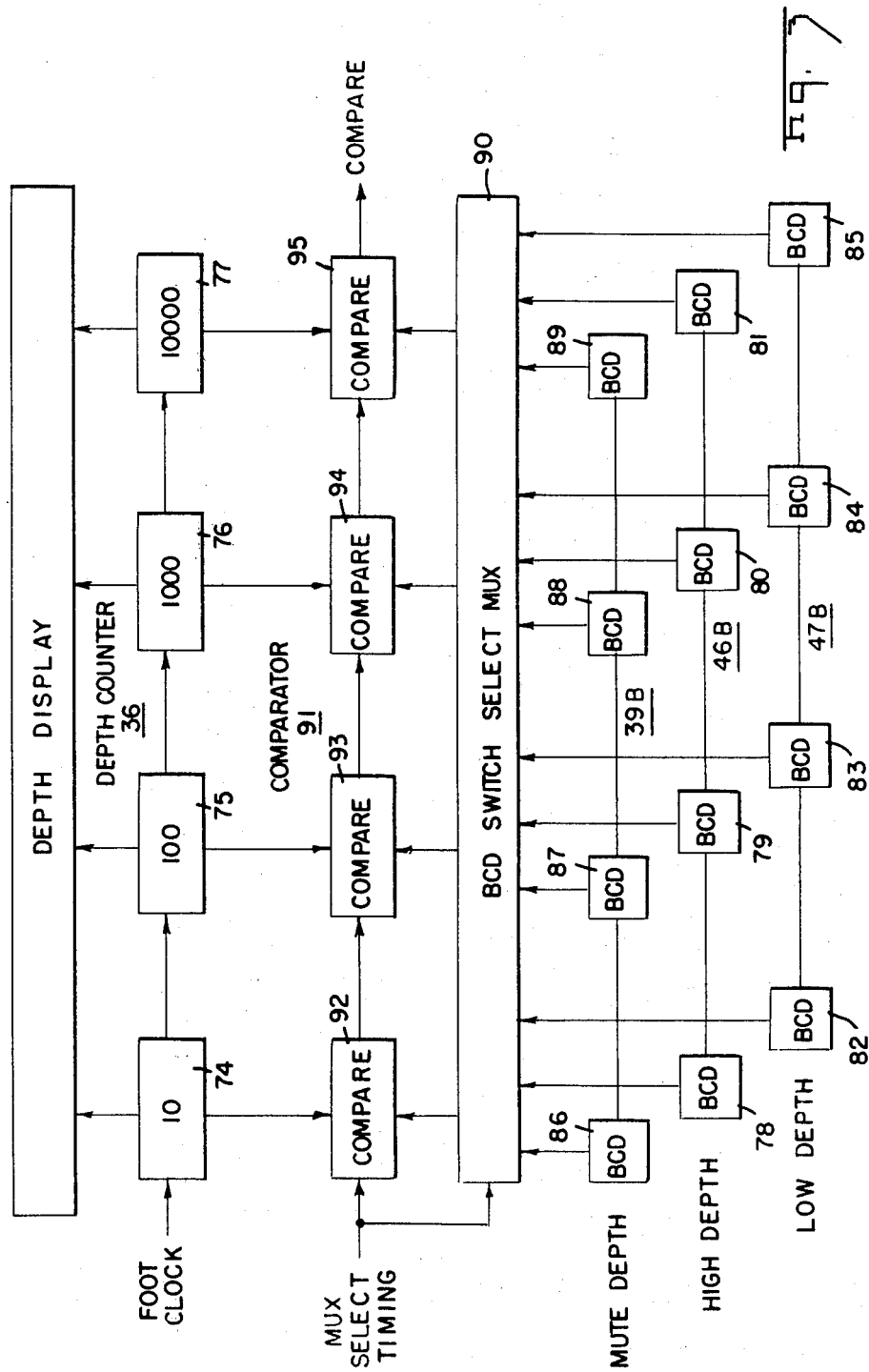

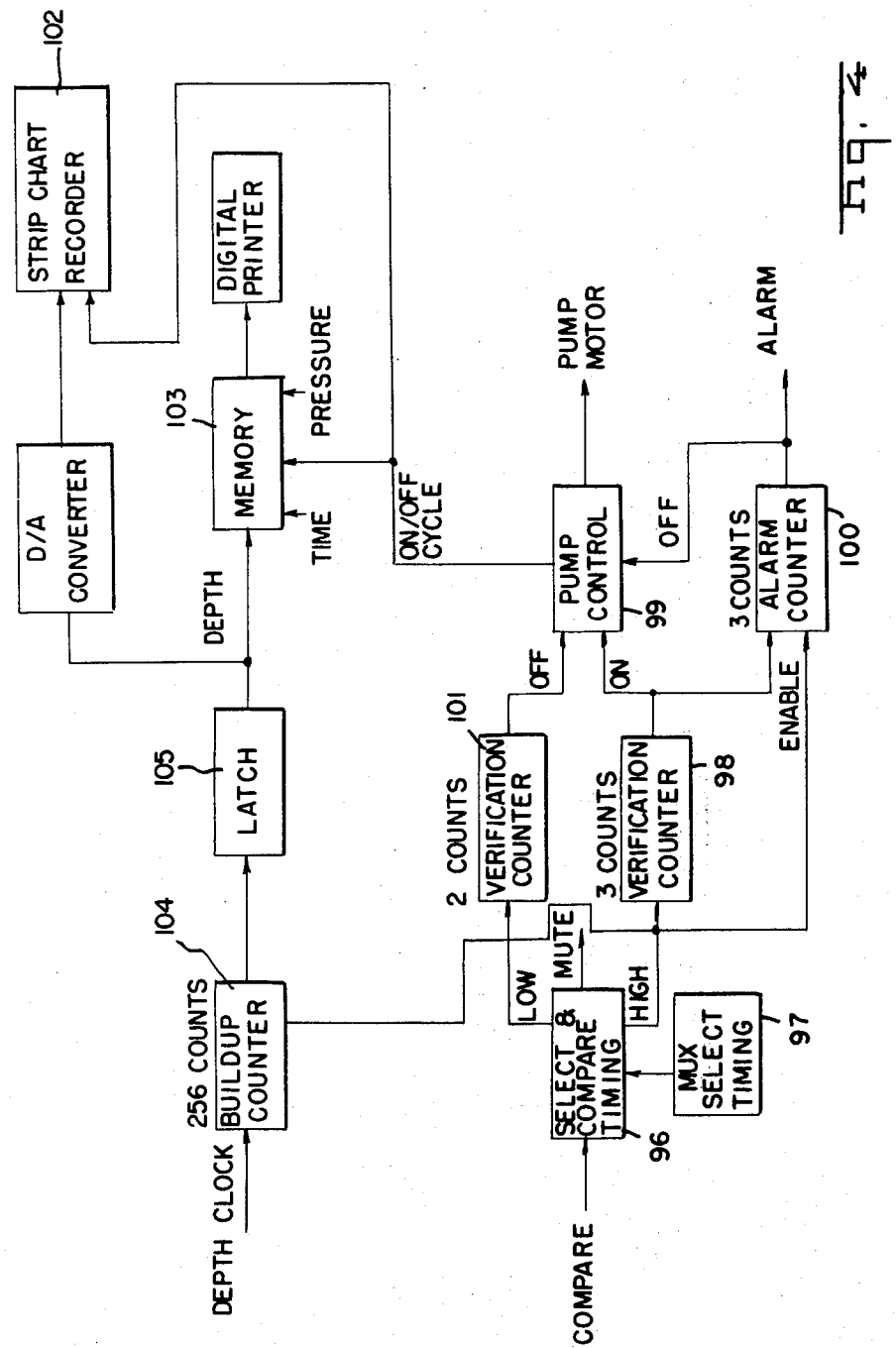

AUTOMATIC LIQUID LEVEL CONTROLLER

This application is a continuation of application Ser. No. 822,506, filed Aug. 8, 1977, now U.S. Pat. No. 4,318,674, which is a continuation-in-part of application Ser. No. 749,940, now abandoned filed Dec. 13, 1976 which was a continuation of application Ser. No. 563,249, now abandoned, filed Mar. 28, 1975. Application Ser. No. 822,507, now abandoned, filed Aug. 8, 1977, is a divisional continuation-in-part directed to a liquid level monitor.

BACKGROUND OF THE INVENTION

This invention relates to apparatus for and methods of automatically continuously determining the depth of the liquid surface in a pumping well and automatically controlling the depth.

PRIOR ART

Pumping wells generally have a pumping capacity greater than the inflow into the well. This is done to compensate for the loss of efficiency due to wear on the valves and plunger with time and to eliminate the need to change the pump if repressuring of the formation is contemplated or the gas cut is expected to increase. As a result of this over-sizing, most of the rod pumped wells will "pump-off," or draw the produced liquids down to the pump inlet. When this condition occurs, solution or free gas will be drawn into the pump chamber forming a gas cap on the upstroke of the pump. On the downstroke, the piston will fall freely through the gas cap and strike the liquid surface. This condition is called "pounding" and produces high stress reversals in the sucker rod strong. This pumping condition should be avoided to prevent rod failure.

Most state of the art control systems are pump-off controllers which reduce the number of times a pump "pounds" but do not eliminate the problem. Ideally, the liquid in the well should be allowed to build up to approximately 10 to 15 percent of its shut-in height and them pumped down to within a few feet of the pump inlet. This method of pumping not only eliminates "pounding" but will produce the well more efficiently. The controller of this invention accomplishes this method of pump control.

Pump-off controllers are popular because of their low cost and ease of installation. One type, which is shown in U.S. Pat. Nos. 3,817,094 and 3,838,597 Montgomery et al, measures the load on the walking beam of the pump by means of a strain gage welded to the upper web of the beam, and is manufactured by End Device, Inc. of Midland, Tex. for the Halliburton Co. When the well is pumped off, the beam load changes rapidly because of "pounding." This rapid change in load is sensed by the strain gage transducer and the well is shut off after three such changes in load are sensed. The off time of the pump is controlled by a manually adjustable timing clock.

Another type of pump-off controller responds to a change in the pumping motor current when pump-off occurs. Again at least three pounding cycles are detected to prevent false triggering and the off time is set by the timing clock.

Another controller measures the actual flow rate of the well by means of a flow line differential pressure guage. The down time and pump up time are set by the operator. If the well pumps off, the flow transducer will shut off the pump. The operator must then change the various times until the well is operating properly. This system is not self-adaptive to changes in the productivity of the well and therefore is not a truly automatic pump controller.

Another controller measures the bottom-hole pressure during pumping. This system requires a cable clamped to the production tubing to provide the control signal at the surface. A high fluid level is set on the monitor and the pump is shut off on pump down. Because of the labor costs of installing the wire line and the problems involved in servicing the well, this system is relatively expensive and has not proved to be popular.

SUMMARY OF THE INVENTION

This invention overcomes many of the shortcomings of the state of the art techniques described above.

In accordance with this invention, acoustic pulses are produced and acoustic pulses reflected from the liquid surface are detected. The time difference between each acoustic pulse and the detected reflected pulse is determined. This time difference is used to control the operation of a pump.

In accordance with another aspect of the invention, a digital output representing the time difference is produced. The digital output is used to control the pump which maintains the liquid level in the well at a desired depth or between two selected depths in the well.

This arrangement has many advantages: (1) it prevents the well from "pumping off" so that "pounding" does not occur, thus reducing maintenance costs, (2) by using a recorder or running time meter on the motor and a total time clock, changes in the productivity of the well can be recorded and used to evaluate well performance, and (3) the entire operation can be monitored by a remote computer system so that the system can be monitored, optimized and controlled.

In accordance with another aspect of the invention, manually settable digital registers calibrated in units of depth contain the high level and low level set points for the pump and the mute depth. A multiplexer sequentially compares these registers to the digital liquid depth as determined by counting clock pulses between the initiating acoustic pulse and the detection of the reflected acoustic pulse.

In accordance with another aspect of this invention, measurements of liquid depth which turn the pump on are confirmed by generating several initiating acoustic pulses and counting clock pulses at frequent intervals to prevent turn off of the pump by an erroneous reading.

In accordance with another aspect of the invention, an alarm is actuated when the measured liquid depth continues to exceed the high level set point after the counted clock pulses exceed the high set point level.

In accordance with another aspect of the invention, the well controller is used to pump a set allowable volume of liquid from a well during a given time period.

Other objects, features, and advantages of the invention will be better understood from the following description and appended claims.

BRIEF DESCRIPTION OF THE DRAWINGS

FIG. 1 is a block diagram of the automatic liquid level monitor used for intermittent pump control;

FIG. 2 shows a typical well makeup;

FIG. 3 shows the digital registers for the controller;

FIG. 4 shows the digital circuitry for controlling the pump; and

FIG. 5 depicts a portion of a well.

DESCRIPTION OF THE PREFERRED EMBODIMENT

Figure 2A:
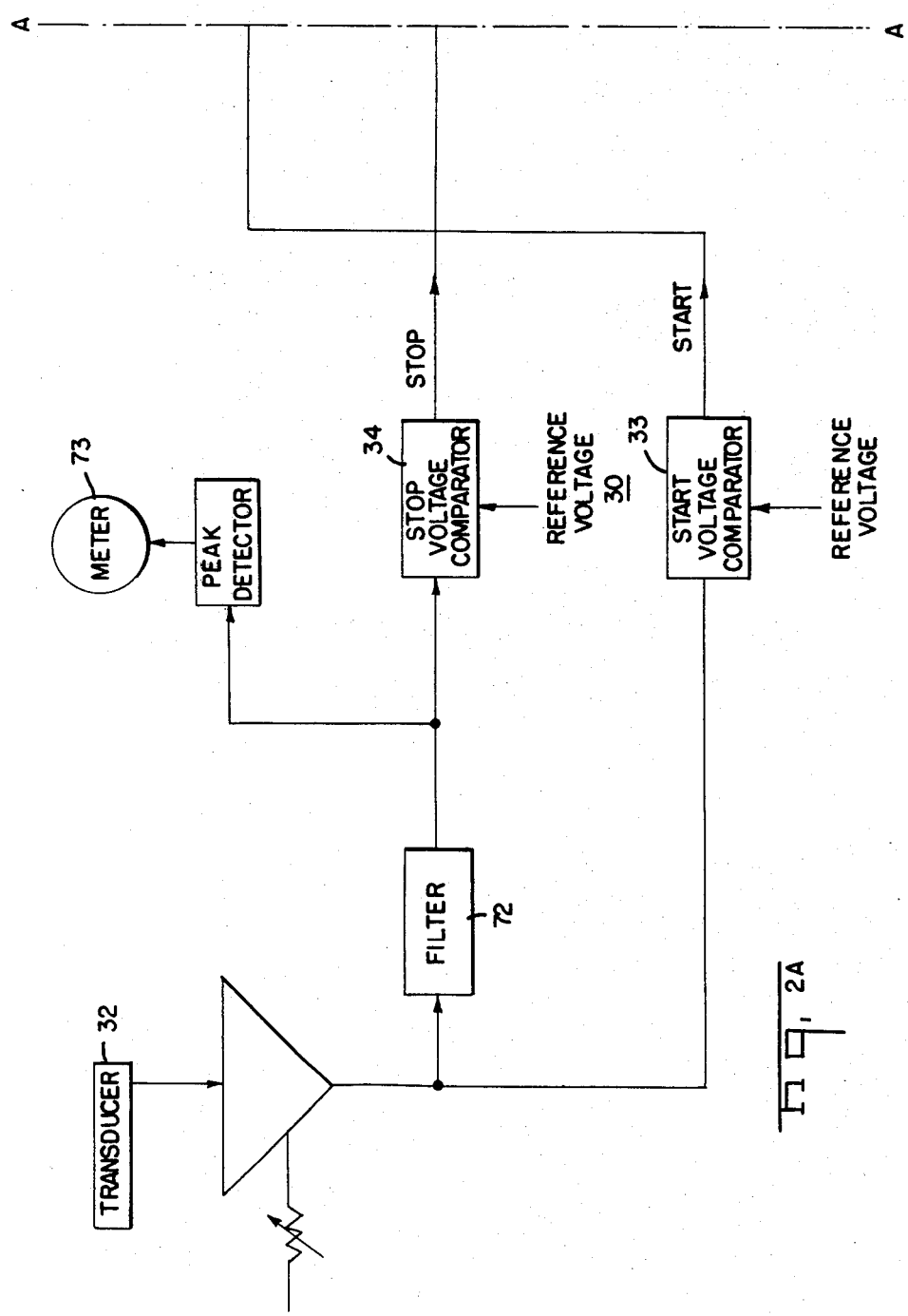
FIGS. 2A and 2B show the gating circuit, counter and firing control circuit.

FIG. 2 shows a typical well in which the controller may be used. A string of tubing 11 is suspended by a tubing hanger 12 within a casing 13. The tubing includes a number of sections joined by tubing collars 14. The tubing has a pump inlet 15 and usually terminates in a gas anchor 16. A sucker rod 17 extends through a packing gland 18. A pump 19 is connected to the sucker rod. The casing nipple 20 is used to couple acoustic pulses to the annulus 21 between the string of tubing 11 and the casing 13.

Referring to FIG. 1, the source of acoustic pulses includes a compressed gas cylinder 22 which commonly contains nitrogen. Gas from cylinder 22 flows through a pressure regulator and through the three-way solenoid valve 24 to the expansion chamber 25. Solenoid valve 24 repetitively couples gas from the chamber 25 to the casing nipple 20 to generate initiating acoustic pulses in the well annulus.

The opening of solenoid valve 24 is controlled by valve driver 26 which has a manual adjustment for controlling the duration of each acoustic pulse. Digital electronics including a firing time circuit 29 are used to obtain an initiating acoustic pulse according to any desired time schedule.

The firing time circuit is controlled by the clock pulse source 31. Clock pulses from this source are also used in the digital control circuitry.

An acoustic transducer 32 is coupled to the well and produces an electric signal in response to the occurrence of acoustic pulses in the well annulus. Electric signals from the transducer 32 are applied at the time of the initiating pulse to a gating circuit 30, including first and second voltage comparator circuits. The first voltage comparator circuit produces a start pulse upon the occurrence of the initiating acoustic pulse in the well. This starts counting of clock pulses by digital means, including preset counter 35 and the mute time circuit 39.

The other voltage comparator produces a stop pulse upon detection of the acoustic pulse reflected from the liquid surface of the well. The stop pulse is connected to the preset counter 35 to stop the counting of clock pulses.

The first voltage comparator circuit has an adjustable trigger level. This allows the operator to set the level of the signal which produces a start pulse so that the circuit detects the initiating acoustic pulse. Similarly, the second voltage comparator circuit has an adjustable trigger level so that the circuit detects the desired reflected pulse.

The mute depth circuit 39 is actuated coincidentally with the initiating acoustic pulses. The mute depth circuit 39 is connected to a gating circuit to render it inoperative until the occurrence of a pulse reflected from an adjustable depth. Mute depth circuit 39 includes a manually settable digital register. The contents of this register are compared with the digitally measured liquid depth. When comparison occurs, the gating circuit 30 is enabled to stop the counting of counter 35.

Manually adjustable pulse counter 35 produces one output pulse for a given number of input pulses and the given number is adjustable. Clock pulses of 500 KH or 2 $\mu$sec period pulses from source 31 are applied as input pulses. Since the manually settable switch 41 is calibrated in terms of $\mu$sec/foot the 2 $\mu$sec pulses are used to account for the round trip travel time of the acoustic pulse. This switch 41 is then read in terms of inverse velocity in $\mu$sec/ft. The pulse output from counter 35 is applied to two manually settable comparators and associated circuits 46 and 47. Circuit 46 produces a pulse when the liquid level rises above the high level set point manually set into the divider. Circuit 47 produces a pulse when the liquid level drops below the low level set point. The output of circuit 46 is used to start the motor, and the output of circuit 47 is used to stop the motor. By this means, the well can be pumped in its most efficient mode. The high level set point would be adjusted so that the liquid level would not rise high enough to limit the inflow to the well and the low level set point would be adjusted to a level just above the pump inlet.

As an optional feature, a running time meter can be installed in the motor line to indicate the total ON time. A total time indicator can also be used to measure the total time the well is under local control. The total ON and OFF times can then be determined and a record of these times would indicate a change in productivity of the well.

This entire system can be monitored and recorded by a remote display and/or computer system so that a complete record of well performance can be maintained. This system would also indicate a broken rod condition, loss in pump efficiency, and loss of control of the system as well as the well performance. The actual sounding of the well could also be initiated from a remote point at any time by overriding the solenoid timing circuit. The actual depth to the liquid in this case could be observed by placing an appropriate modem on the output of the adjustable preset counter 35.

The velocity of the acoustic wave in the automatically controlled well is preset manually upon installation, as in the case of the well monitor described in our divisional application. This system works well with the pump running. The mute depth control is used in a manner similar to the mute time control described in our divisional application. The firing time circuit can be adjusted to any convenient cycle time and can even be modified to sound the well at more frequent intervals during pump down than during buildup. This change in sounding time may be necessary since most wells pump down much faster than they build up. This modification conserves the gas supply. Of course, if the gas pressure in the annulus is high enough, a two-port valve system can be used and no external gas supply is necessary.

If a variable speed motor control system is used, this circuit can be used to maintain a constant liquid level under continuous pumping conditions. In this case, the depth to the liquid would be measured in the same way. However, only one set-point detector would be used. If the liquid rises in the well, the set-point detector furnishes an analog voltage proportional to the deviation from the set point. This voltage is used to increase the motor speed. If the liquid falls below the set point, the motor speed is decreased until equilibrium is attained. A digital-to-analog linear converter is included in the set-point circuit of this embodiment.

The automatic control of the pumping rate, either by ON-OFF or proportional control operation, is a feature of the invention. Not only will direct pumping control maximize the pumping efficiency and decrease maintenance, it also provides very important information on the rate of buildup, or the inflow rate and its change over extended time periods.

Figure 2B:
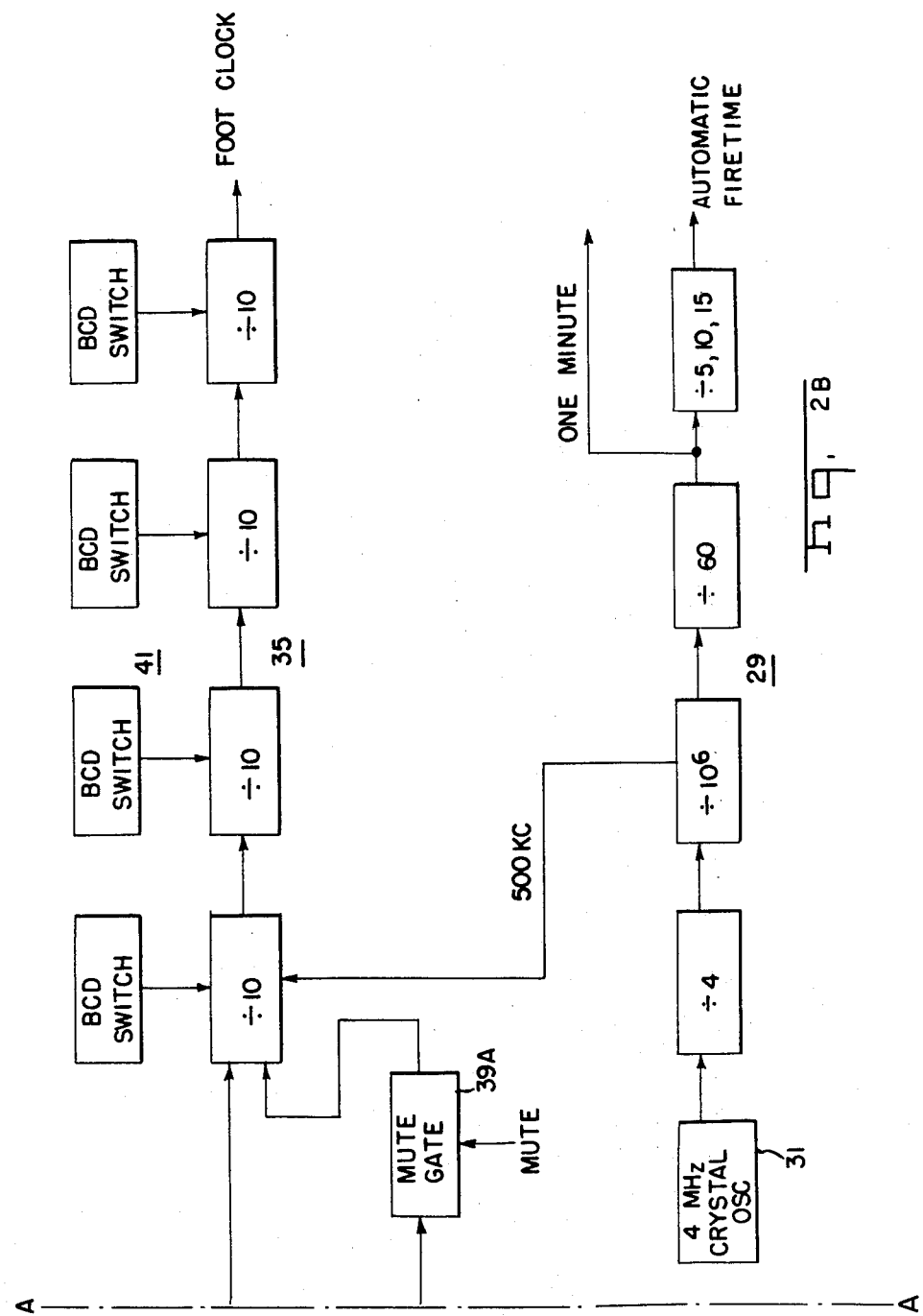
Figure 7:
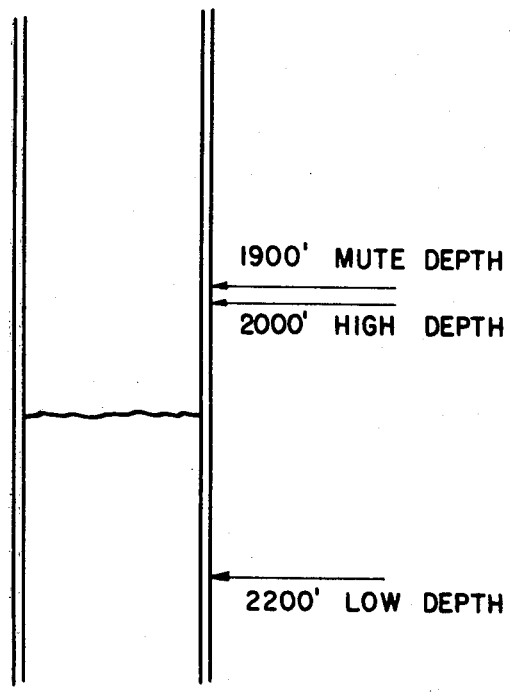

FIGS. 2A and 2B show the circuitry of the counter 35 and the firing time circuit 29. Acoustic transducer 32 is coupled to the well and produces an electric signal in response to the occurrence of acoustic pulses in the well annulus. This electric signal is applied to first voltage comparator 33 which produces a start pulse. Upon the occurrence of the initiating acoustic pulse in the well, this starts counting the clock pulses by the preset counter 35.

The output of the transducer 32 is also connected to the filter 72 which normally passes 5 Hz pulses reflected from the liquid level in the well. Filter 72 can also be set to pass 20 Hz pulses reflected from tubing collars. The center frequency can easily be changed to satisfy a particular well.

The second voltage comparator circuit 34 produces a stop pulse upon detection of the reflected acoustic pulse. The stop pulse is connected to the preset counter 35 to stop counting. The stop pulse is applied to the counter through the mute gate 39A. The mute gate 39A is disabled and enabled by a MUTE signal which is produced in the circuit of FIG. 4. The mute signal disables the gate 39A until the count in depth counter 36 (FIG. 3) reaches a selected count corresponding with a selected depth. At this time, the MUTE signal enables the mute gate 39A.

FIGS. 2A and 2B also show the firing time circuit 29, oscillator clock 31 and peak meter 73, all of which are more fully described in our divisional application.

FIG. 3 shows the manually settable registers 46B and 47B included in the digital high level and low level set point circuits 46 and 47, the manually settable register 39B for setting mute depth. Pulses representing one foot increments are produced by the counter 35 of FIG. 2. These pulses, referred to as "foot clock," are applied to the depth counter 36 which includes counting stages 74–77.

The manually settable digital high depth register 46B includes stages 78–81. The manually settable digital low depth register 47B includes stages 82–85. A manually settable mute depth register 39B includes stages 86–89. A multiplexer 90 sequentially applies the contents of these three registers to a comparator 91 which includes stages 92–95. The contents of the register are sequentially compared with the depth as represented by the count in the depth counter stages 74–77.

The operation can best be understood with reference to FIG. 5 which depicts a portion of the well between about 1,900 feet and 2,200 feet. Assume that the mute depth register 39B has been set to a mute depth of 1,900 feet; the high depth register 46B has been set to a high depth of 2,000 feet; and the low depth register 47B has been set to a low depth of 2,200 feet. After the occurrence of an initiating acoustic pulse, the depth counter 36 starts counting pulses. When the number counted exceeds 1,900, comparator 91 produces a "compare" output which is applied to the timing circuit 96 of FIG. 4. The timing circuit 96 responds to a compare signal to produce either a "mute," "low" or "high" signal depending upon the condition of multiplex select timing circuit 97. If the multiplexer is comparing the contents of the mute register with the depth register, a MUTE signal is produced. This enables the mute gate 39A (FIG. 2B) so that the next occurring detected reflection will stop the counting of preset counter 35 (FIG. 2) and of the depth counter 36 (FIG. 3). When the depth counter 36 is stopped, its contents are compared with the contents of high depth register 46B and low depth register 47B. MUX select timing circuit 97 FIG. 4 controls this sequential comparison. If the multiplexer 90 is comparing the contents of the low depth register 47B with the depth counter 36, a "low" signal may be produced; and if the multiplexer is comparing the contents of the high depth register 46B with the depth counter 36, a "high" signal may be produced.

Assume the liquid level is between the high and low depth set points as shown in FIG. 5. In this case, no "compare" output is produced and the pump is neither started nor stopped, but continues in its present state of energization. If the depth counter 36 is greater than 2,000 feet, a compare output is produced which starts the pump. If the contents of depth counter 36 are greater than 2,200 feet, a compare is produced which stops the pump.

FIG. 4 also shows the circuitry which turns the pump on and off.

Before the pump is turned on, reverification readings are required. Counter 98 counts the number of high signals produced. After three have been counted, pump control 99 is turned on. If any one of the three shots should show the level to be below the set point, the timer will revert to its normal selected timing cycle and the next indication of a high level will again cause the one minute confirming cycle to take effect. After the pump is started, the firing time will still be at its normal selected timing interval. After this time, if the liquid level is still high and is confirmed by three outputs from counter 98, the alarm counter 100 produces an output. This actuates an alarm indicating pump failure.

When the well is pumped down to the lower set point, timing circuit 96 produces a "low" signal. Verification counter 101 requires one confirming shot at a one minute interval to shut off the pump.

A permanent record of the liquid level and on and off times is produced on the strip chart recorder 102. The recorder will indicate the depth to the liquid relative to the high set point on the main portion of the chart and an event marker on the right hand edge of the chart will indicate whether the pump motor is on or off. Since the chart is driven by a timing motor, the resultant plot is liquid level vs. time and the length of the on and off times of the pump. A selector switch is used to change the span of the recorded liquid depth scale from 50 to 250 feet in 50-foot intervals. This selection of ranges will cover a majority of the pumping wells, but can be changed to other selected intervals, if required.

This information should prove valuable to the operator in determining changes which can affect production. If the pump on time begins to increase, it may indicate pump wear and incipient failure. Likewise, an increase in the off time indicates a reduction in the inflow rate due to decrease in formation pressure or an increase in apparent skin effect, or both. Of course, if the inflow rate increases, the pump time should also increase, but the off time would decrease proportionately. This could provide valuable information, especially in a secondary recovery project.

The measured depth of the on and off cycle are stored in memory 103. The buildup counter 104 registers the liquid level as referred to the high depth setting and is stored in latch 105 and transferred to the recorder 102. This produces a plot of the liquid buildup and drawdown throughout the controlling cycle. The liquid depth may also be displayed in feet on a digital liquid depth display.

The circuitry of this invention may take many forms within the skill of a person working in this art. The circuitry shown in FIGS. 2A-2E of the divisional application directed to the well monitor is one example only of the circuitry used to implement FIG. 1.

The calibration of the controller can be accomplished by setting the mute depth to approximately halfway down the gas column. The first collar reflection below this depth will stop the counter and display its depth when the filter is set to pass high frequencies. The mute depth is then increased so that the next collar is detected. The difference in these depth readings is the tubing joint length and provides a means of calibration based on the known distance between collars. Of course, several tubing joints should be measured in this manner to improve the accuracy of the calibration.

Normally the controller can most easily be calibrated to the pump-down depth as more fully described in the divisional application.

After the acoustic velocity calibration has been accomplished, the high and low set points must be selected. This selection is most easily done if a buildup and drawdown characteristic of the well is obtained. This can be obtained by use of the monitor described in the divisional application. The high set-point is usually selected to be at a liquid level which is 10 to 15 percent of the final buildup level to be expected if the well is shut in for a very long time. This rule-of-thumb was arrived at by observing on the buildup curve that the inflow of the well is not restricted appreciably during this period of the buildup.

Referring for example to the buildup curve shown in FIG. 5 of our divisional application, the high and low depths are selected so that the well is always operating on the linear portion of the buildup curve. For example, the well whose buildup characteristic is depicted in FIG. 5 might have a low depth of 3,400 feet and a high depth of 3,300 feet. The lower set point is selected to be a few feet above the pump inlet.

The repetitive firing time is selected next by using the buildup and draw-down curves. The liquid level can be determined at intervals of 1, 5, 10 and 15 minutes. In high volume wells, it may be necessary to set the firing time at one minute intervals. In low volume wells, fifteen minute intervals may be adequate.

After these adjustments are made, the controller can be placed in automatic operation and will perform the control functions without any further attention.

The well controller can also be used to pump a set allowable from a well during each 24-hour period. This can be accomplished by first obtaining an accurate well test which will define the ratio of water-oil produced by the wall. Since the amount of oil in the liquid phase is known and the volume in terms of feet of liquid per barrel in the annulus is also known, the controller will produce a known amount of oil between the high and low control points set on the instrument during one pump cycle. The requisite number of pump cycles can then be set to make the oil allowable. After the allowable is produced, the well is shut-in until the next 24-hour period arrives and the process is repeated. Since the liquid level will rise above the upper set point during this off period, the instrument can be made to measure this liquid level even through it is above the high set point and simply accumulate the actual number of feet the liquid level has dropped.

All of the information accumulated by the well controller can be transmitted to a remote readout or central computer for observation of the operation. The alarm signal from the controller and the on-off pump cycle-times can be transmitted to a remote location to allow early detection of an abnormal situation. It is also possible to control the high and low set points, and to control on the actual volume of liquid produced from the annulus by use of a central control computer.

While a particular embodiment of the invention has been shown and described, various modifications are within the true spirit and scope of the invention. One modification is to utilize a digital-to-analog converter driven by the depth counter to provide an analog strip chart recording of the depth of the liquid surface vs. time. The following claims are, therefore intended to cover all such modifications.

What is claimed is:

1. Apparatus for controlling a pump suspended in a well comprising:
   a source of periodic acoustic pulses continuously coupled to said well;
   a transducer coupled to said well producing an output in response to the occurrence of acoustic pulses in said well and in response to the detection of the acoustic pulse reflected from the liquid surface in said well;
   a clock pulse source;
   digital counting means;
   gating means responsive to the output of said transducer for starting the counting of clock pulses by said digital counting means upon the occurrence of an acoustic pulse in said well and for stopping said counting upon detection of the acoustic pulse reflected from the liquid surface in said well; and
   a digital controller responsive to said digital counting means for controlling said pump, said digital controller including:
      a high level set-point circuit including a manually settable digital register calibrated in units of depth;
      a low level set-point circuit including a manually settable digital register calibrated in units of depth; and
      a comparator, said digital registers and said counting means being connected to said comparator, said comparator being connected to turn said pump on in response to counting clock pulses between said periodic acoustic pulses and said detection of the acoustic pulse reflected from the liquid surface when the liquid in said well exceeds the high set-point level and to turn said pump off in response to counting clock pulses between said periodic acoustic pulses and said detection of the acoustic pulse reflected from the liquid surface when the liquid in said well falls below the low set-point level.

2. The apparatus recited in claim 1 wherein said acoustic pulses include a component reflected from the liquid surface having a frequency content centered about 5 Hz.

3. The apparatus recited in claim 1 wherein said acoustic pulses include a component reflected from the tubing collars in said well having a frequency content centered about 20 Hz.

* * * * *